FIG. I

Nov. 23, 1971  K. J. BROWN  3,621,514
HOG SKINNING METHOD

Filed Feb. 23, 1971

INVENTOR:
KENNETH J. BROWN

3,621,514
HOG SKINNING METHOD
Kenneth J. Brown, P.O. Box 1539,
Plainview, Tex. 79072
Original application Oct. 27, 1969, Ser. No. 869,828.
Divided and this application Feb. 23, 1971, Ser.
No. 117,971
Int. Cl. A22b *5/16*
U.S. Cl. 17—50              4 Claims

ABSTRACT OF THE DISCLOSURE

A hog hung by the hamstrings is skinned by cutting the skin from the belly, legs, and head, then holding the head down while pulling the hide upward.

CROSS-REFERENCE TO RELATED APPLICATIONS

This is a division of my previously filed application Ser. No. 869,828 filed Oct. 27, 1969, entitled Hog Skinning, now Pat. No. 3,599,277, issued Aug. 17, 1971.

BACKGROUND OF THE INVENTION

(1) Field of the invention

This invention relates to butchering and more particularly to the process of skinning a hog.

(2) Description of the prior art

Traditionally, hogs were butchered by first killing each hog; then, scalding, scraping, gutting and cutting it up. The individual cuts were sometimes skinned to please the housewife.

In the butchering of other animals, particularly beef, they have been traditionally skinned. A method of skinning beef is shown in the patent to Knauss, U.S. Pat. No. 3,404,431, issued Oct. 18, 1968. However, the hair folicles of the beef do not extend into the fat as they do with the hog. For this reason until my invention it was not feasible to skin a hog as shown by the patent to Knauss.

SUMMARY OF THE INVENTION

According to this invention, after the hog is killed, hung by the hamstring and bled, the feet are removed. Using a knife, the skin of the legs is slit and skinned free of the legs; the belly portion of the skin is slit and skinned back.

The head is skinned with the snout and ears being left attached to the skin. Thereafter, a chain is attached to the ears, the skin being slit along the back of the head. A hook is placed in the lower jawbone, at the base of the chin, and a chain which is attached to the hook is attached to a hydraulic cylinder to hold the head down. The chain attached to the ears of the hog is attached to a hook, which is pulled almost straight upward toward the hamstring shackle.

After skinning, the carcass is spray-rinsed with water, gutted and cut up.

Some of the advantages of skinning a hog are outlined below:

(1) It eliminates the costly process of de-hairing the hog;

(2) It is a more sanitary way of handling the animal carcass;

(3) There is a reduction of labor inasmuch as, in the majority of cases, the hide is taken off the cuts after the hog has been de-haired in any event;

(4) There is an increase in yield inasmuch as there is less loss if the hide is taken off first rather than at a later time;

(5) There is an increase in the value of the hide, both as to quality and yield;

(6) There is an increase in value of the lard because in present practice, much of the lard is rendered from the fat while it is still attached to the skin;

(7) The fat is left intact on the carcass and the hide is removed completely from the carcass with a very minimumof fat attached to the hide.

The only loss experienced in this operation is the snout, which goes with the hide and feet to tankage. However, the value of snout and feet on today's market is negligible.

An object of this invention is to prepare a hog for cutting into pieces.

Another object of this invention is to pull the hide from a hog.

Other objects are to achieve the above with a method that is safe, sterile, rapid, efficient and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DETAILED DESCRIPTION OF THE PREFERRED EMBODIMENT

Figure 1:
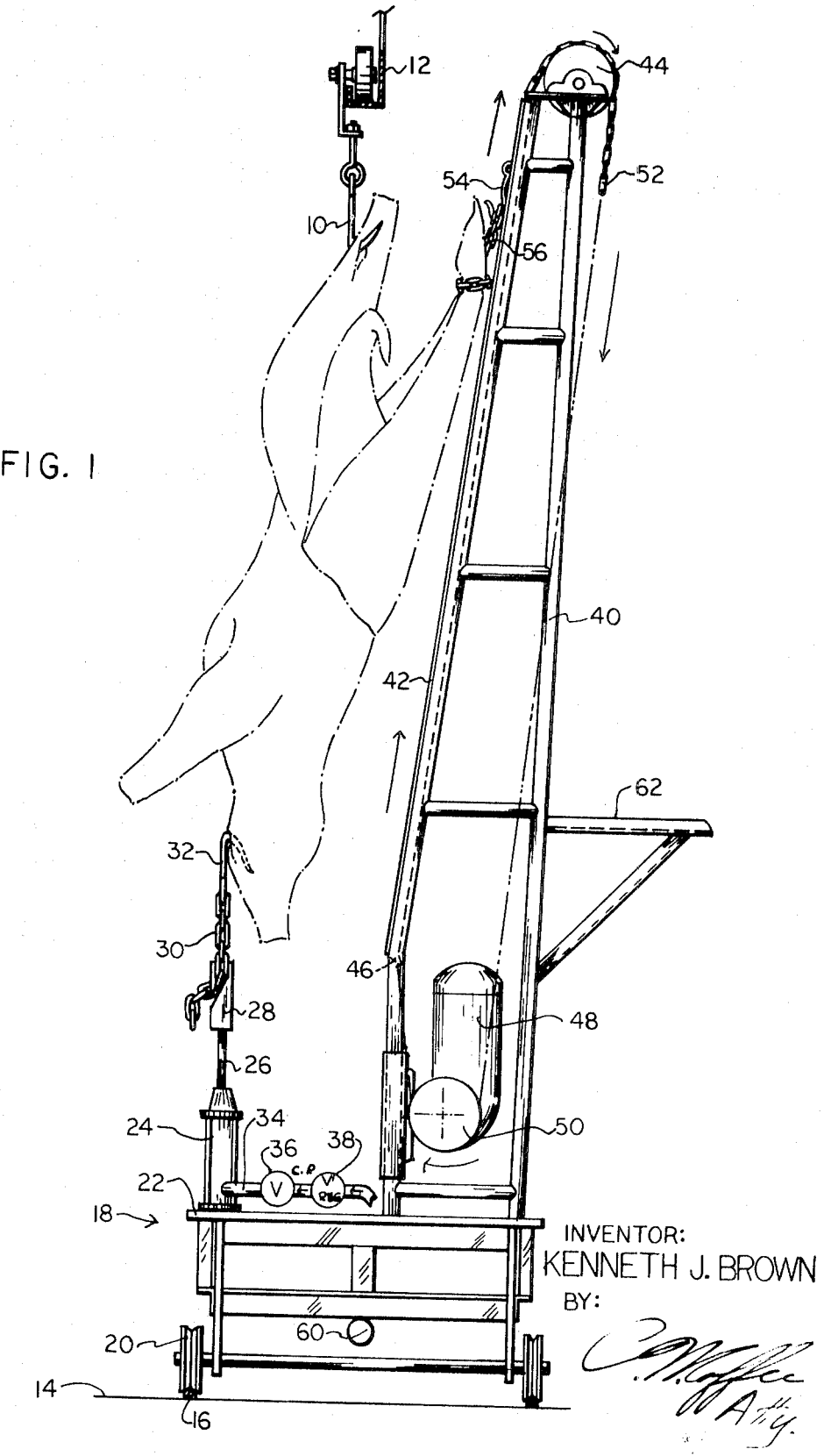
FIG. 1 is a side elevational view of the equipment used in this invention with some parts in section and other parts schematically represented.
Figure 2:
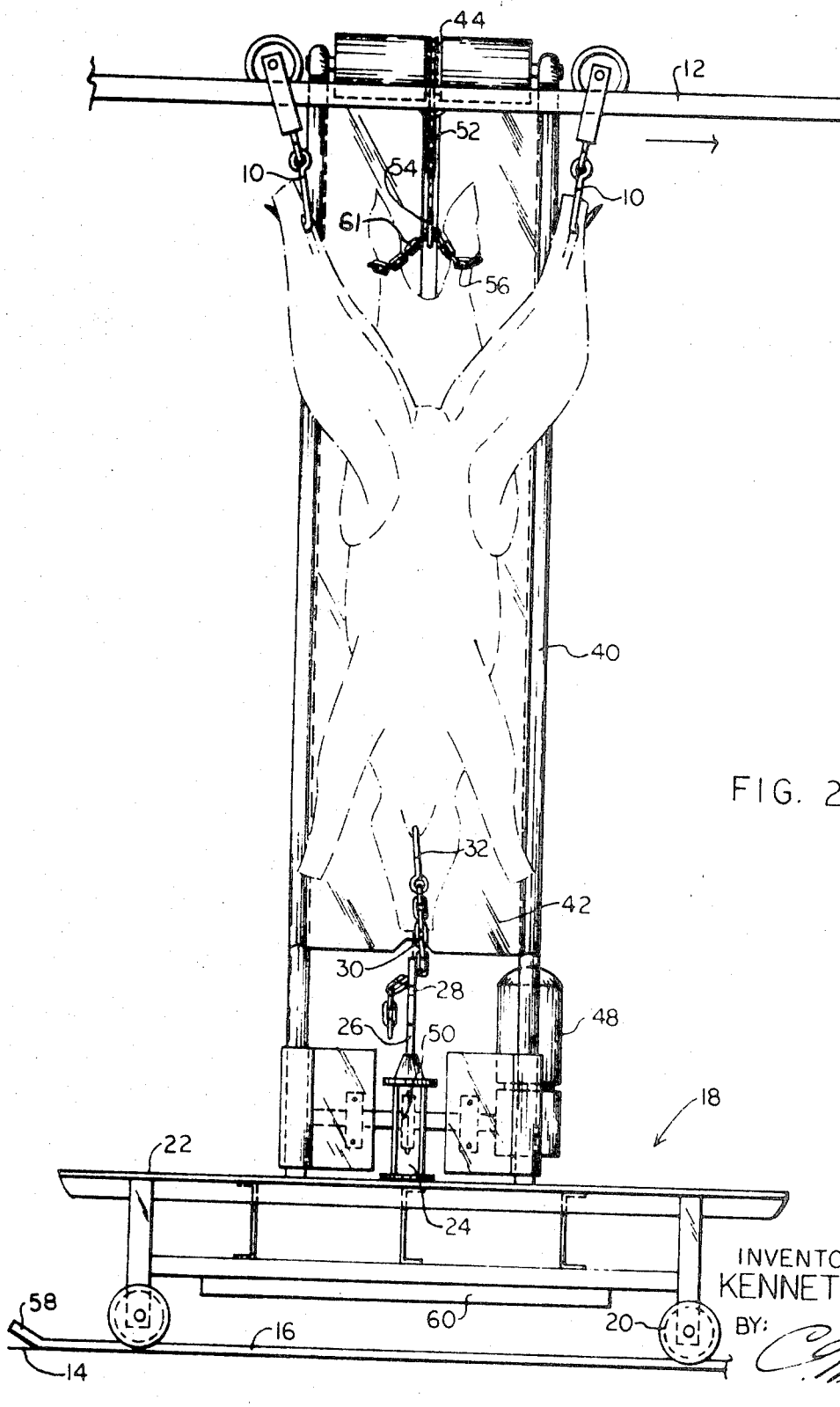
FIG. 2 is a front elevational view of the equipment.

The equipment used to carry out this invention is illustrated in the drawing. As in conventional slaughter houses, the carcass is hung by its hamstrings from hooks or shackles 10. The shackles are attached to conveyor 12 attached to the ceiling; thus the hogs are movingly hung by their hamstrings from the conveyor 12. Floor 14 is beneath the conveyor and the floor and conveyor are connected by the building structure of the slaughter house.

According to this invention, a short section of track 16 is set into the floor 14 below the conveyor 12 and parallel thereto. Carriage 18 with wheels 20 is mounted to move on the track 16 so that the carriage is mounted for movement on the floor with the movement of the carriage parallel to the conveyor 12. The carriage has flat deck 22. On the forward side of the deck 22 about the center thereof, there is mounted pneumatic cylinder 24 which has piston rod 26 extending therefrom and rod hook 28 on top of the rod. The cylinder 24 is connected by conventional air hose 34 to control valve 36 and pressure regulator valve 38 which is a source of air under pressure to the cylinder 24. Rod-hook 28 releasably received hook-chain 30, which is attached to jawbone-hook 32. Therefore, the cylinder 24 together with the other enumerated equipment form means for pulling down on the jawbone of the hog.

By adjusting the air pressure at the pressure regulator 38, the force by which the jawbone is pulled down may be regulated. I have found that using a cylinder having an effective piston area of 1.4 square inches and setting the pressure regulator at up to 80 p.s.i. is satisfactory. This is about 120 pounds pull upon the jawbone. I have found it desirable to use the greatest pull possible without breaking the jawbone. If lesser pressure is used, more difficulty is experienced with the fat tending to pull from the carcass with the hide rather than remaining with the carcass. Since the total pull is generally no greater than 120 pounds, the weight of the carriage 18 is sufficient to hold the carriage down and it is not necessary to have the wheels of the carriage running under flanges. However, as a matter of design, the carriage could be built lighter and the wheels hooked down so that the pull of the jawbone hook 32 upward would not tend to lift the wheels 20 of the carriage 18 from the track 16.

Upstanding rack 40 is built on the deck 22. The rack has chain guide 42 which is flat, facing the hog. The chain guide 42 extends upward about ten feet from the deck 22. The guide 42 is approximately fourteen inches behind an imaginary line drawn from the air cylinder 24 to the conveyor 12 and parallel thereto. The rack 40 has braces which extend to the rear of the chain guide 42. Roller or top pulley 44 is at the top of the rack and bottom guide 46 is at the bottom of chain guide 42. Motor 48 with a drive sprocket 50 drivingly attached thereto is to the rear of the bottom guide 42. Endless chain 52 is trained around the drive sprocket 50, the bottom guide 46, up the chain guide 42, around the top pulley 44 and back to the drive sprocket 50. Thus the endless chain 52 is driven by the motor 48 so that it moves upward along the chain guide 42.

Ear-chain hooks 54 are attached to the endless chain 52 at regular intervals thereon. They point upward so they are adapted to engage ear chains 56 and move them upward. I have found it advantageous to have the motor 48 operate at all times and therefore, the endless chain 52 is continually moving and the ear-chain hooks 54 are continually moving upward along the guide 42. As may be seen from the drawing, ear-chain hook 54 will move upward within about two inches of the back of the carcass and substantially toward the feet of the hog which is the point at which the carcass is shackled by its hamstrings to the conveyor 12.

As is standard slaughter house practice, the carcasses will be slowly but continually moving along the conveyor 12; therefore, during the skinning operation, this movement of the carcass along the conveyor will pull the carriage 18 along the track 16 in the direction of movement of the conveyor. Each time a carcass is released from carriage 18 by releasing the cylinder 24 and removing hook 32 from the jawbone of the carcass, it is necessary to return the carriage 18 to stops 58 in the track 16 by return air cylinder 60, which is located at the carriage 18 below the deck 22. Providing a simple return mechanism is well within the skill of ordinary mechanics and is not described in detail herein, but it is noted that I have provided means for returning the carriage 18 to the stops 58 on the track 16, which is the beginning of the operation for pulling the hide from each of the carcasses.

Describing the operation, the skin is freed from the belly, legs, and head, by conventional technique. The skin is slit along the back of the head and the ears are cut free of the carcass, but left attached to the skin. The ear chain 56 is attached by the loops at each end to the ears of the hog, leaving bight 61 between the ears. The jawbone hook 32 is attached to the lower jawbone and the chain 30 is hooked into the rod hook 28 and the valve 36 actuated to tension the hog with sufficient tension to hold the carcass taut from the shackles 10 to the jawbone hook 32.

The ear chain 56 is hooked over the first ear-chain hook 54, which comes by on the endless chain 52. By this action, the hide is pulled from the carcass. As previously noted, the hide is pulled by the ear-chain hooks 54 within two inches of the back of the carcass of the hog and will be pulled in the direction toward the shackles 10 which attach the carcass by its hamstrings to the conveyor 12. As the conveyor moves the carcass during the operation, the carriage will also be moved inasmuch as the carriage is connected through the carcass to the conveyor. When the hide has been pulled from the carcass, it will pull over the top of rack 40 and will fall over upon platform 62, which is built onto the back of the rack 40 about thirty-seven inches above the deck 22. When the hide falls, the ear chain 56 will fall free of the ear-chain hook 54. At this point the ear chains 56 may be removed from the hide and the hide pushed down slides and chutes to be passed through an opening in the slaughter house floor 14 for further processing.

As a variation, a chain may be looped around the head of the hog to hold the body of the hog taut. However, a chain around the head of the hog is not as convenient as the hook through the jawbone and is more likely to damage the carcass. Also, the problems of sterilizing the chain to be used around the head are greater than those of sterilizing the hook.

Although I have shown the skin being pulled by a hook on an endless chain, it will be understood that the pulling hook could be moved upward by any of a number of mechanisms, e.g., a winch, as shown in the Knauss patent referred to above. The pulling upward on the skin continues until the skin is completely free of the hog.

The hide can be pulled from heels to head by rearrangement of the carriage and reversing certain operations. However, better success has been had by pulling the hide from the head to the heels. Furthermore, the hide can be cut from the back and pulled from the belly, but this not only presents other problems, but greatly reduces the value of the hide.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. The method of skinning a hog comprising the steps of:
    (a) hanging the carcass of a hog by the hamstrings of the rear legs,
    (b) freeing the hide from the feet, belly and head of the carcass,
    (c) pulling downward on the head to hold the carcass taut, then
    (d) grasping the hide at one end and
    (e) pulling the hide from the carcass by
    (f) pulling the hide longitudinally close to the back.
2. The invention as defined in claim 1 with the additional limitations of
    (g) pulling downward on the head by engaging the jawbone and pulling downwardly thereon.
3. The invention as defined in claim 1 with the additional limitations of grasping the hide by
    (g) looping chains around the ear portions of the hide, and
    (h) pulling the chains so attached toward the rear legs.
4. The invention as defined in claim 3 with the additional limitations of
    (j) pulling downward on the head by engaging the jawbone and pulling downwardly thereon.

References Cited

UNITED STATES PATENTS

| | | | |
|---|---|---|---|
| 2,871,509 | 2/1959 | Poupet | 17—21 |
| 3,325,905 | 2/1966 | Schmidt | 17—21 |
| 3,404,431 | 10/1968 | Knauss | 17—50 |
| 3,432,789 | 1/1969 | Ochylski | 17—21 |

FOREIGN PATENTS

| | | | |
|---|---|---|---|
| 1,346,412 | 11/1963 | France | 17—21 |

LUCIE H. LAUDENSLAGER, Primary Examiner